C. L. ROWLAND.
SUBAQUEOUS ROCK BREAKER.
APPLICATION FILED FEB. 19, 1909.
Reissued Mar. 30, 1909.
12,933.
3 SHEETS—SHEET 1.
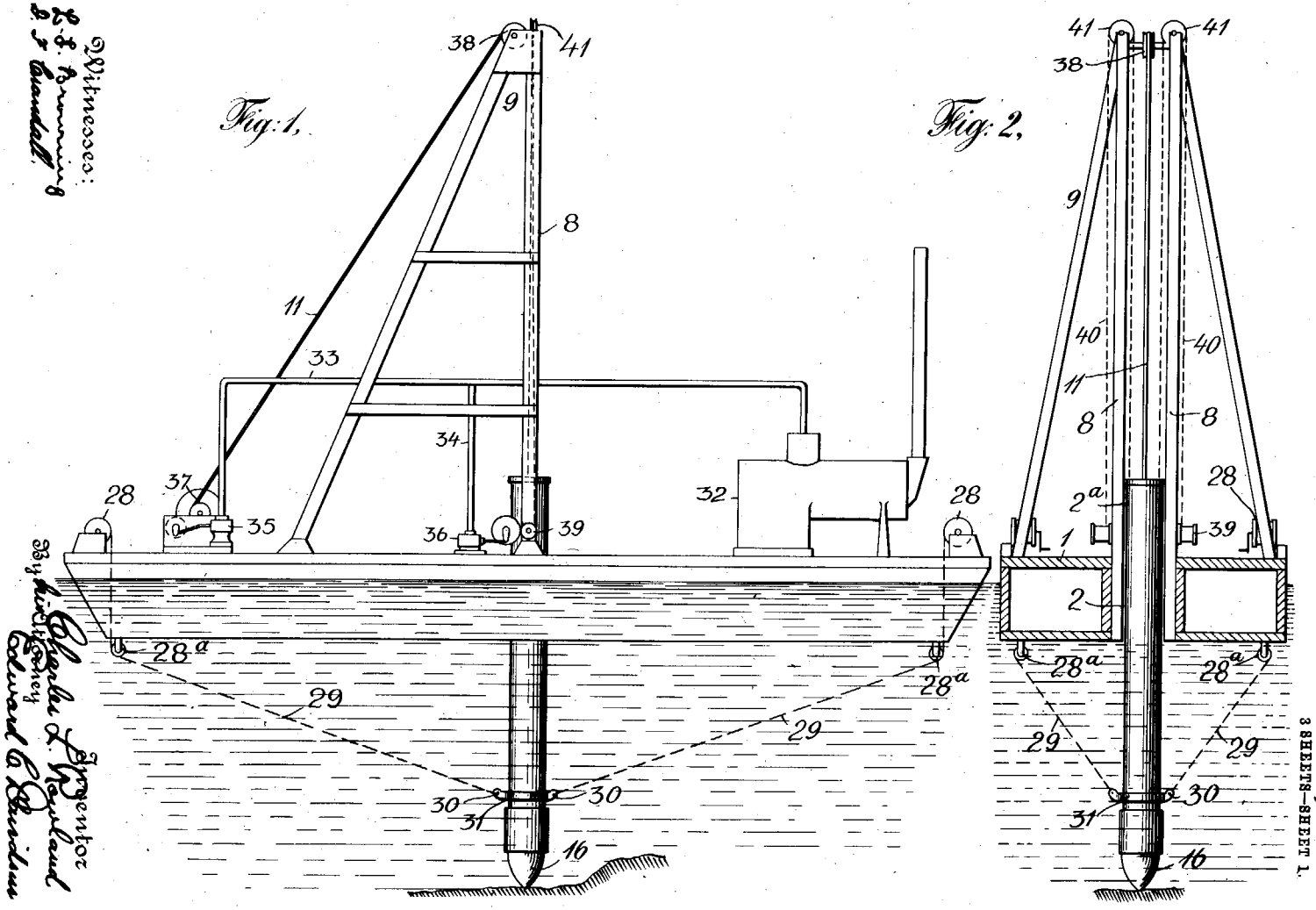
Witnesses:
L. S. Browning
D. F. Crandall.
Inventor
Charles L. Rowland
By his Attorney
Edward C. Davidson C. L. ROWLAND.
SUBAQUEOUS ROCK BREAKER.
APPLICATION FILED FEB. 19, 1909.
Reissued Mar. 30, 1909.
12,933.
3 SHEETS—SHEET 2.
Fig. 4,
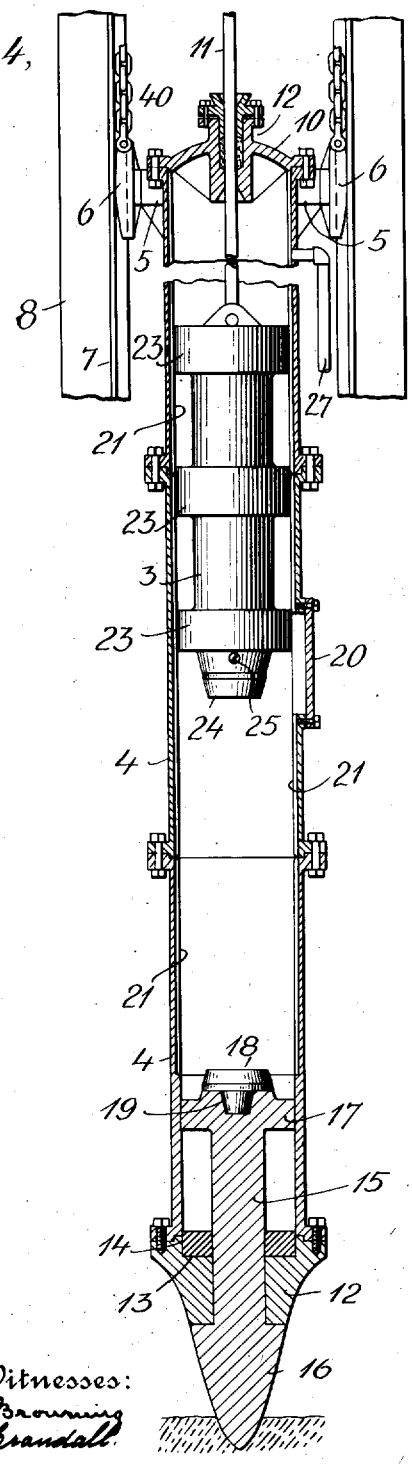
Fig. 3,
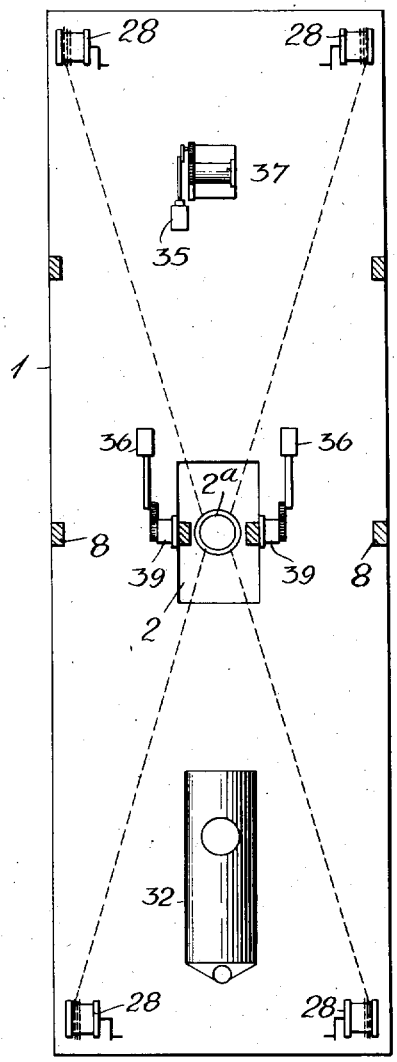
Witnesses:
R. S. Browning
D. J. Brandall
Charles L. Rowland Inventor
By his Attorney
Edward C. Davidson C. L. ROWLAND.
SUBAQUEOUS ROCK BREAKER.
APPLICATION FILED FEB. 19, 1909.
Reissued Mar. 30, 1909.
12,933.
3 SHEETS—SHEET 3.
Fig. 7,
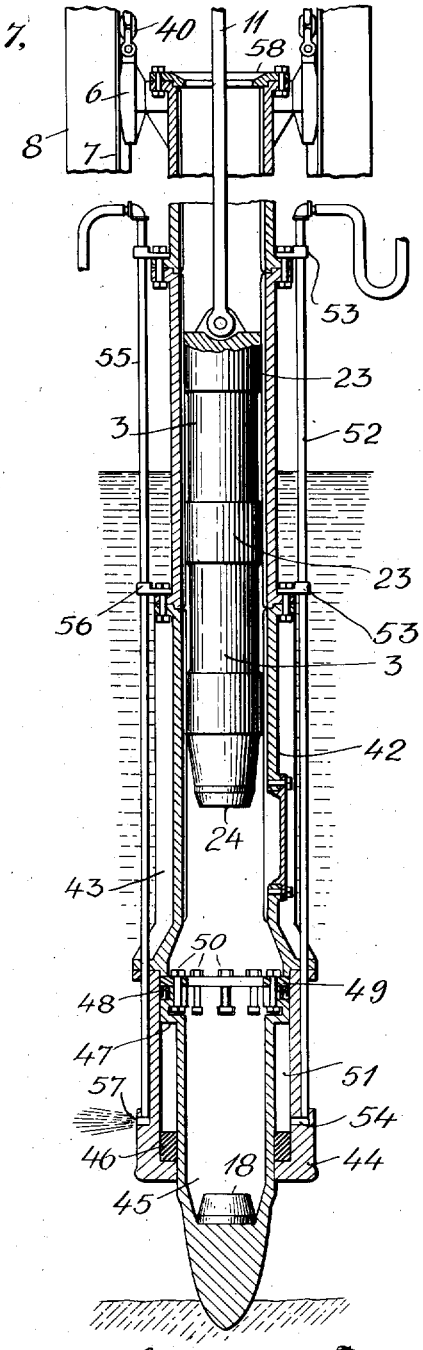
Fig. 5,
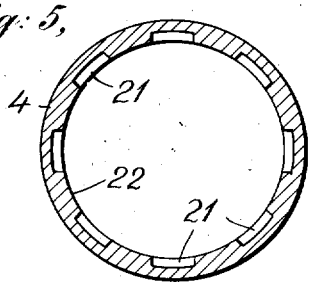
Fig. 6,
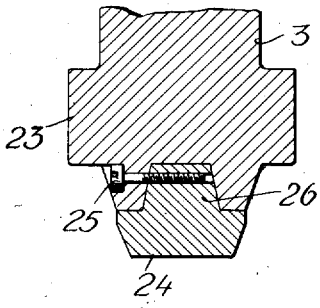
Witnesses:
L. S. Browning
O. F. Crandall
Inventor
Charles L. Rowland
By his Attorney
Edward C. Bandur

UNITED STATES PATENT OFFICE.

CHARLES L. ROWLAND, OF NEW YORK, N. Y.

SUBAQUEOUS ROCK-BREAKER.

No. 12,933. Specification of Reissued Letters Patent. Reissued Mar. 30, 1909.

Original No. 907,407, dated December 22, 1908, Serial No. 171,791. Application for reissue filed February 19, 1909. Serial No. 478,997.

*To all whom it may concern:*

Be it known that I, CHARLES L. ROWLAND, a citizen of the United States, and a resident of the city, county, and State of New York, have invented certain new and useful Improvements in Subaqueous Rock-Breakers, of which the following is a specification.

This invention relates to sub-aqueous rock breakers in which a weight or hammer traveling in a vertical guide-way, caisson or tube acts upon a rock breaking chisel point or wedge that rests on the rock to be broken.

In the apparatus constructed in accordance with this invention the device, having the rock breaking chisel, point or wedge and that is acted upon by the hammer is carried at the lower end of the guide way, caisson or tube and has a movement, independently and longitudinally thereof. One advantage of such an organization is that, when the blow is struck by the hammer, the caisson is not subjected to shocks and strains which would tend to disrupt its joints, or to break away from its end the rock breaking device were it rigidly attached thereto. Aside from this, the invention comprises other features of novelty hereinafter set forth in detail.

In the accompanying drawings: Figure 1 is a side elevation of a float showing the arrangement and operation of this improved apparatus; Fig. 2 is a cross section thereof; Fig. 3 is a plan view of the float showing the location of the operating mechanism; Fig. 4, a central vertical sectional view of the hollow caisson containing the hammer and carrying the chisel or rock breaking device; Fig. 5, a cross sectional view of the same; Fig. 6, a sectional view of the end of the hammer showing the method of attaching the impact plate; and Fig. 7 a central vertical sectional view of a modified form of caisson and rock cutting chisel.

The float or hull 1 may be of any desirable construction and has at a central point a well or opening 2 through which plays and is adjusted a hammer guide way, tube or caisson $2^a$ containing the hammer 3, and made up of sections 4 bolted together to form a caisson of any desired length. The upper section has lateral lugs 5 carrying shoes 6 which straddle and run on ways 7 secured to the inner faces of the vertical timbers or guide frame 8 of a derrick 9. The upper end of the caisson is in Fig. 4 closed by an air tight cap 10, having an opening for the passage of a rod or wire rope 11, around which a stuffing box 12 is applied. The tubular section forming the lower end of the caisson has secured to it a ring 12 with an annular seat 13 for the reception of a buffer 14 of rubber or some similar substance; and through the openings of the buffer and the ring plays the shank 15 of the rock breaking device composed of a point 16 of appropriate shape, a head 17, and intervening shank 15. The head is provided with a hardened anvil or plate 18, to receive the impact of the hammer, and having on its under face a lug 19 seated in a socket in the head. One, or more, of the tubular sections is provided with a manhole 20 to afford access for alterations and repairs, and each section is channeled or grooved, as at 21, to form wearing strips 22 and reduce the friction of the hammer on the tube while the grooves form air passages offering opportunities for the circulation of the air as the hammer changes its position in the caisson. The play of the shank of the rock breaker in the ring 12 relieves the tube of the jar or shock accompanying impact of the hammer on the anvil, thereby obviating weakening and disruptive strains on the caisson.

The hammer 3 is shown as having several bearing rings 23 to secure a minimum of friction; and these rings are united by the body proper of the hammer, while to the lower end is secured a hardened tip or shoe 24 identical with the face 18 of the anvil head 17, but held in place by a bolt 25 passing through the walls of the socket in the lower end of the hammer and into the lug 26.

The upper tube section may have a pipe 27 to supply a certain pressure of air to the tube to prevent the entrance of water in case of imperfect joints, and an air pump may be provided at some convenient point on the float.

As shown in Fig. 4, the channels 21 in the interior face of the caisson terminate above the head 17 of the rock breaking device or chisel. The compressed air will leak past the head 17 and shank 15 preventing entrance of water, and at the same time affording a pneumatic cushion for the head 17 when driven down by the hammer.

In Fig. 7 a pipe 52 is shown for directly delivering compressed air below the head or flange 47 of the rock breaking device, and in such case the blow of the hammer may cause part of the air to be driven back into the compressed air tank on the float. The pressure of air below the head 17 Fig. 4, or 47 Fig. 7 may be such as to exclude water and yet not afford any substantial resistance to the blow of the hammer, serving merely as a cushion.

At each corner of the float is a windlass or drum 28 to receive and wind one end of a chain 29 whose other end after passing under pulley 28[a] on the bottom of the float is secured to one of the four perforated lugs 30 of a collar 31 encircling the lower end of the tube or caisson. These devices afford a means located below the float for effecting accurate vertical disposition of the caisson and cutter point 16. On the float is a steam generator 32 from which pipes 33 and 34 lead steam to the engine 35 and the two engines 36, 36. The engine is geared with a winding drum 37 around which passes the rope or cable 11; or, in case a rod is used through the stuffing box 12, the cable is secured to it at some point below the pulley 38 in the top of the derrick frame. A suitable tripping or releasing device is connected with the drum 37 to let the hammer in the caisson drop. The oscillating engines 36 are geared with hoisting drums 39 at the base of the vertical timbers 8 of the derrick. These drums carry the cables or chains 40 which are supported on each side of the uprights 8 by the pulleys 41 in the upper end of the derrick and are secured one at each side of the caisson 2[a] and to the shoes as is shown in Fig. 4. When it is necessary to re-locate the chisel, or to move the float, the engines 36 are put in motion and the caisson hoisted.

In the modified arrangement shown in Fig. 7 there is a lower tube section 42 with vertical ribs 43 and a flared opening at its lower end. To this flared end is secured a cylinder 44 in which plays the rock breaker device 45, and in the bottom of which is the buffer ring 46. The part 45, in this form of the device, is a shell with a solid point and its top edge, or what is practically its base, is enlarged as at 47 to contain the packing 48 which is held in place by the ring 49 and its bolts 50. The removable impact plate 18 is provided in the bottom of the shell. The air within the space 51 below the flange or head 47 may be allowed to escape and return through the pipe 52 which is supported by brackets 53 at the union of the tube sections and whose lower end is coupled with a lateral interior opening 54 in the base of the cylinder.

In addition to the cables 29, in order to counteract the lateral strains of tidal or other currents which tend to displace the caisson from vertical position, a series of pipes 55 may be carried by the caisson being supported in brackets 56 or otherwise. These pipes communicate with nozzles or outlets 57 arranged around the periphery of the cylinder 44, and may be supplied with steam, water or air, under pressure, and provided with appropriate valves or cocks by which they may be independently controlled. The reaction of the jets of steam, air or water issuing from the nozzles 57 serves to maintain the caisson against lateral displacement by current.

The caisson in Fig. 7 is provided with one or more manholes, as indicated; and its upper end is left open, it being contemplated that, in this construction, compressed air will not be introduced into the upper part of the caisson. There is, however, an inwardly projecting ring attached to the upper end of the caisson to limit the upward movement of the hammer.

In Fig. 7, the interior of the caisson is not channeled, as in Fig. 5, but has inwardly projecting ribs which serve as bearings for the hammer and the spaces between which afford passage for circulation of air as the position of the hammer in the caisson is changed.

In operation, the caisson is supported by the rock breaking point or chisel which bears on the rock to be broken or crushed, there being, however, sufficient slack of the chains 40; and when the hammer has driven the point of the rock breaker downwardly and the hammer is raised, the caisson moves down so that the rock breaker is caused to assume its inward position in the caisson. The parts or anvil plates 18 and 24 of the rock breaking device and hammer may be removed and replaced when broken or injured by repeated impact, the hammer, in apparatus of this kind, being of considerable weight. The ability to exert lifting strain independently on the cables 40 which support the caisson affords a further means for controlling its vertical position. The caisson or tube acts both as a support and guide for the independently movable rock breaking device and likewise as a guide for the hammer. It is closed against admission of water to avoid loss of energy that would be consumed by displacement of the water. If the compressed air is not used to keep water out of the tube, such leakage of water as may occur, may be removed by a pump, being drawn, for instance, through pipe 52.

I claim—

1. In a sub-aqueous rock-breaker, the combination of a vertical tube, a chisel movable through the bottom thereof, a hammer separate from the chisel and adapted to reciprocate therein and strike the chisel, means for reciprocating the hammer, and means for keeping the tube substantially free from water.

2. In a sub-aqueous rock breaker, a vertical tube, a chisel movable through the bottom thereof, a hammer separate from the chisel and adapted to reciprocate therein and strike the chisel, means for reciprocating the hammer, and means for keeping the tube substantially free from water in combination with a guide frame mounted on a hull and adapted to hold the tube upright while permitting vertical movement thereof, and means for raising and lowering the tube.

3. A sub-aqueous rock breaker comprising the combination of a vertically disposed tube having longitudinal ribs on its inner surface, a chisel extending through the bottom of the tube and capable of independent movement longitudinally thereof, a hammer adapted to be reciprocated in the tube and traveling upon the interior ribs thereof, means for raising and dropping the hammer, and means for keeping the tube substantially free from water.

4. A sub-aqueous rock breaker comprising the combination of a vertically disposed tube having air passages in its walls, a hammer adapted to be reciprocated in the tube, a rock-breaking chisel fitted in a bearing in the lower end of the tube and capable of movement therein longitudinally of the tube, and means for raising the hammer and dropping it upon the chisel, and means for keeping the tube substantially free from water.

5. A sub-aqueous rock breaker comprising the combination of a vertically disposed tube with closed side walls, a hammer adapted to be reciprocated in the tube, a rock-breaking chisel fitted in a bearing in the lower end of the tube, capable of movement therein longitudinally of the tube and having its inner end terminating adjacent the bottom of the tube and means for raising the hammer and dropping it upon the chisel.

6. In a sub-aqueous rock breaker, the combination of a vertical tube, a chisel movable through the bottom thereof, a hammer separate from the chisel and adapted to reciprocate therein and strike the chisel, means for reciprocating the hammer, means for keeping the tube substantially free from water and removable impact face-pieces on the hammer and chisel.

7. A sub-aqueous rock breaker comprising the combination of a vertically disposed tube having closed side walls, a rock breaking chisel fitted to move through the bottom thereof and having an inner headed end, means for maintaining air pressure under the head of the chisel to exclude water, a hammer adapted to be reciprocated in the tube and means for raising the hammer and dropping it upon the chisel.

8. A sub-aqueous rock breaker comprising the combination of a vertically disposed tube having closed side walls, a rock breaking chisel fitted to move through the bottom thereof and having an inner headed end, means for maintaining air pressure under the head of the chisel to exclude water, a hammer adapted to be reciprocated in the tube, means for raising the hammer and dropping it upon the chisel and a buffer in the end of the tube for the head of the chisel.

9. A sub-aqueous rock-breaker comprising the combination of a hull or float, a vertically disposed tube carried thereby, a hammer adapted to reciprocate in the tube, a chisel to be struck by the hammer, fitted to move through the bottom of the tube, means for raising the hammer and dropping it upon the chisel, independent means for raising and lowering the tube and means for keeping the tube substantially free from water.

10. A sub-aqueous rock breaker comprising the combination of a vertically disposed tube, a chisel carried at the lower end thereof and guided to move longitudinally of and independently of the tube, a hammer independent of the chisel reciprocable within the tube, means for reciprocating the hammer and means for controlling the rise of water in the lower end of the tube.

11. A sub-aqueous rock breaker comprising the combination of a vertically disposed tube, a chisel carried at the lower end thereof and guided to move longitudinally of and independently of the tube, a hammer independent of the chisel reciprocable within the tube, means for reciprocating the hammer and means for supplying compressed air to the tube to control by its pressure the rise of water in the lower end of the tube.

12. A sub-aqueous rock breaker comprising the combination of a vertically disposed tube with closed side walls, a hammer adapted to be reciprocated in the tube, a rock-breaking chisel having a bearing at the lower end of the tube on which bearing it is capable of movement longitudinally of the tube and having its upper end terminating adjacent the bottom of the tube and means for reciprocating the hammer.

13. A sub-aqueous rock breaker comprising the combination of a vertically disposed closed tube, a hammer reciprocable therein, a rock breaking chisel having a bearing at the lower end of the tube on which bearing it is capable of movement longitudinally of the tube, and means for reciprocating the hammer.

CHARLES L. ROWLAND.

Witnesses:

L. F. BROWNING,

EDWARD C. DAVIDSON.